(12) United States Patent
Luong

(10) Patent No.: US 9,819,402 B2
(45) Date of Patent: Nov. 14, 2017

(54) AJUSTABLE ANTENNA

(71) Applicant: NXP B.V., Eindhoven (NL)

(72) Inventor: Jean-Luc Luong, Caen (FR)

(73) Assignee: NXP B.V., Eindhoven (NL)

( * ) Notice: Subject to any disclaimer, the term of this patent is extended or adjusted under 35 U.S.C. 154(b) by 483 days.

(21) Appl. No.: 13/906,209

(22) Filed: May 30, 2013

(65) Prior Publication Data
US 2013/0321235 A1    Dec. 5, 2013

(30) Foreign Application Priority Data

May 31, 2012 (EP) .................................. 12290179

(51) Int. Cl.
*H01Q 7/00* (2006.01)
*H04B 5/00* (2006.01)
*G06K 19/077* (2006.01)
*H01Q 1/22* (2006.01)

(52) U.S. Cl.
CPC ..... *H04B 5/0081* (2013.01); *G06K 19/07773* (2013.01); *H01Q 1/2216* (2013.01); *H01Q 7/005* (2013.01); *H01Q 1/2208* (2013.01); *H01Q 1/2225* (2013.01)

(58) Field of Classification Search
CPC ............ G06K 7/0008; G06K 7/10346; G06K 19/0723; H01Q 7/00; H01Q 5/378; H01Q 5/50; H01Q 7/005; H01Q 1/2216; H01Q 1/2208; H01Q 1/2225; H01Q 21/06; H01Q 21/08; H01Q 21/28; H01Q 9/16; H01Q 23/00; H01C 7/00; H01C 5/50; H01C 5/378; H01C 7/005; H01C 1/2216; H01C 1/2208; H01C 1/2225; H01C 21/06; H01C 21/08; H01C 21/28; H01P 5/10

USPC ....... 343/850, 867, 866, 876, 870, 745, 748, 343/732, 764, 788, 855, 742–744, 861, 343/868, 853, 859; 340/568.1, 572.2; 455/41.1, 41.2, 41.3, 193.1, 121, 78
See application file for complete search history.

(56) References Cited

U.S. PATENT DOCUMENTS

| 1,479,638 | A | * | 1/1924 | Zworykin | ................ H04B 1/16 343/748 |
| 5,049,857 | A | * | 9/1991 | Plonsky | ............. G08B 13/2408 340/551 |
| 5,151,709 | A | * | 9/1992 | Balzano | ................... H01Q 7/00 343/741 |
| 5,867,132 | A | | 2/1999 | Blasing et al. | |

(Continued)

FOREIGN PATENT DOCUMENTS

| CN | 1914768 A | 2/2007 |
| CN | 102099965 A | 6/2011 |

(Continued)

OTHER PUBLICATIONS

Basic Engineering Ciorcuit analysis, by J David Irwin, Apr. 27, 2004.*

(Continued)

Primary Examiner — Hoang Nguyen
Assistant Examiner — Awat Salih

(57) ABSTRACT

The invention provides an antenna which can be configured to use s selected number of coils but for the same operating frequency. This enables a desired (and adjustable) compromise to be found between power consumption and signal strength.

17 Claims, 2 Drawing Sheets

(56) References Cited

U.S. PATENT DOCUMENTS

| | | | |
|---|---|---|---|
| 6,963,729 B2* | 11/2005 | Uozumi | H01Q 1/22 340/10.1 |
| 7,259,726 B2 | 8/2007 | Ibi et al. | |
| 7,286,086 B2 | 10/2007 | Fang et al. | |
| 7,539,465 B2* | 5/2009 | Quan | 455/121 |
| 8,165,552 B2* | 4/2012 | Rofougaran | H04B 5/0075 343/728 |
| 8,228,196 B1* | 7/2012 | Thornton | G06Q 30/0268 235/378 |
| 8,249,524 B2* | 8/2012 | Darwhekar | H04B 5/0031 343/853 |
| 8,494,446 B2* | 7/2013 | Raggam | G06K 19/0723 340/10.1 |
| 8,886,145 B2* | 11/2014 | Matsui et al. | 455/193.1 |
| 2001/0010507 A1* | 8/2001 | Hiroshima | H01P 1/2056 343/853 |
| 2002/0109642 A1* | 8/2002 | Gee | H01Q 9/00 343/876 |
| 2004/0203361 A1* | 10/2004 | Belcher | G01V 15/00 455/41.2 |
| 2005/0001031 A1* | 1/2005 | Akiho | G06K 7/0008 235/451 |
| 2009/0033467 A1* | 2/2009 | Finocchiaro et al. | 340/10.1 |
| 2010/0117454 A1 | 5/2010 | Cook et al. | |
| 2010/0156574 A1* | 6/2010 | Nohara | H03J 1/0008 334/55 |
| 2010/0245194 A1* | 9/2010 | Sawazaki | H01Q 1/2216 343/743 |
| 2011/0260940 A1* | 10/2011 | Abe et al. | 343/745 |
| 2012/0146865 A1 | 6/2012 | Hayashi et al. | |
| 2012/0235878 A1* | 9/2012 | Mitomo | H01Q 1/50 343/860 |
| 2014/0252878 A1* | 9/2014 | Jantunen | H04B 5/0031 307/104 |

FOREIGN PATENT DOCUMENTS

| | | |
|---|---|---|
| EP | 1160915 | * 12/2004 |
| GB | 2 321 726 A | 8/1998 |
| WO | 2009/115115 A1 | 9/2009 |
| WO | 2011059088 A1 | 5/2011 |

OTHER PUBLICATIONS

Basic Engineering Circuit Analysis, J. David Irwin [ISBN 0471407402].*

Basic Engineering Circuit Analysis, by J. David Irwin.*

Extended European Search Report for Patent Appln. 12290179.6 dated (Sep. 26, 2012).

* cited by examiner

AJUSTABLE ANTENNA

CROSS-REFERENCE TO RELATED APPLICATIONS

This application claims the priority under 35 U.S.C. §119 of European patent application no. 12290179.6, filed on May 31, 2012, the contents of which are incorporated by reference herein.

This invention relates to antenna designs, for example for use in near field communication (NFC) systems.

NFC is a relatively new protocol for contactless communication over short ranges, for example over a maximum range of 10 cm between a NFC device and a card or between two NFC devices. The communication is based on magnetic coupling.

For communication between a NFC device and a card, the NFC device plays the role of a reader. For communication between NFC devices, peer-to-peer communications are established. One of the devices, by taking the initiative of the exchange is named the INITIATOR, the other is named the TARGET.

The NFC system is normalized by ISO18092.

The antenna is a key element for RF communication using magnetic coupling. Basically, the magnetic antenna comprises a certain number of wires loops. The geometrical shape of the loop can typically be rectangular, square or circular.

The antenna design is essentially a compromise between the required magnetic field strength for reliable communication and the desire for low power consumption. However, these are conflicting requirements, and the preferred compromise is different for different applications.

According to the invention there is provided a device and method as claimed in the independent claims.

In one aspect, the invention provides an antenna comprising:
  a set of at least two antenna coils;
  a bank of at least two capacitors; and
  a switching arrangement,
    wherein the switching arrangement is configurable to define at least two operating modes, in which a different combination of antenna coils and capacitors is connected into circuit, such as to define the same operating frequency but with a different number of antenna coils.

This antenna design enables a different number of coils to be switched into the antenna circuit, while maintaining the same operating frequency. Different numbers of antenna coils give rise to a different operating current and power consumption, and different magnetic field strength. Thus, the antenna configuration can be tailored to the particular communications being carried out.

For example, at least two coils can be connected in series in one of the operating modes. When multiple coils are connected in series, for a given driving voltage, this gives a lower current and therefore lower power consumption, but at the expense of a reduced magnetic field. A smaller number of coils can be used to give a stronger magnetic field but with higher current consumption. The configuration can for example be dependent on the energy supply (mains or battery) or the remaining battery life.

The antenna can comprise a set of n antenna coils, and the switching arrangement is configurable to define a plurality of operating modes, each operating mode comprising a different number of the antenna coils in series and a different capacitance in parallel with the antenna coils. A set of different relationships between power consumption and field strength can thus be established. There can be n operating modes, i.e. one for each possible number (1 to n) of coils in series. Alternatively, the number of modes can be less than the number of coils.

The capacitor bank can comprise n capacitors in parallel, and the switching arrangement is then configurable to select a different capacitor or parallel combination of capacitors for each operating mode.

The switch arrangement can comprises a respective switch between one terminal of each coil and the capacitor bank. When one of the switches is selected, it provides the return to the capacitor bank, so that it defines how many inductor coils are in series.

The switch arrangement can further comprise a respective switch between each adjacent pair of coils to define a series connection of all coils. In combination, the two sets of switches enable coils which are not in circuit to be isolated from both ends.

There can be four coils and a pair of control pins can then be used for setting the four different switch settings for four modes.

The antenna can be used in a near field communication apparatus.

In another aspect, the invention provides a method of setting an operating mode of an antenna, which comprises a set of at least two antenna coils, a bank of at least two capacitors and a switching arrangement,
  wherein the method comprises configuring the switching arrangement to define a selected one of at least two operating modes, in which different operating modes a different combination of antenna coils and capacitors is connected into circuit, such as to define the same operating frequency but with a different number of antenna coils.

An example of the invention will now be described in detail with reference to the accompanying drawings, in which.

The invention provides an antenna which can be configured to use s selected number of coils but for the same operating frequency. This enables a desired (and adjustable) compromise to be found between power consumption and signal strength.

The magnetic field produced by an antenna mainly depends on the inductance and the current intensity. The antenna inductance is a function of the geometrical shape of the loop and is proportional to the square of the number of turns. To tune the magnetic field three factors can be used; the antenna geometrical shape, the current intensity, or the number of turns.

The geometrical shape is dictated in general by the external dimensions and the current intensity is limited by the amplifiers.

The invention is based on adjusting the magnetic field by providing controllability of the number of turns. By adjusting the magnetic field, a desired balance between signal strength (which influences the reliability and range of the connection) and power consumption can be found.

Figure 1:
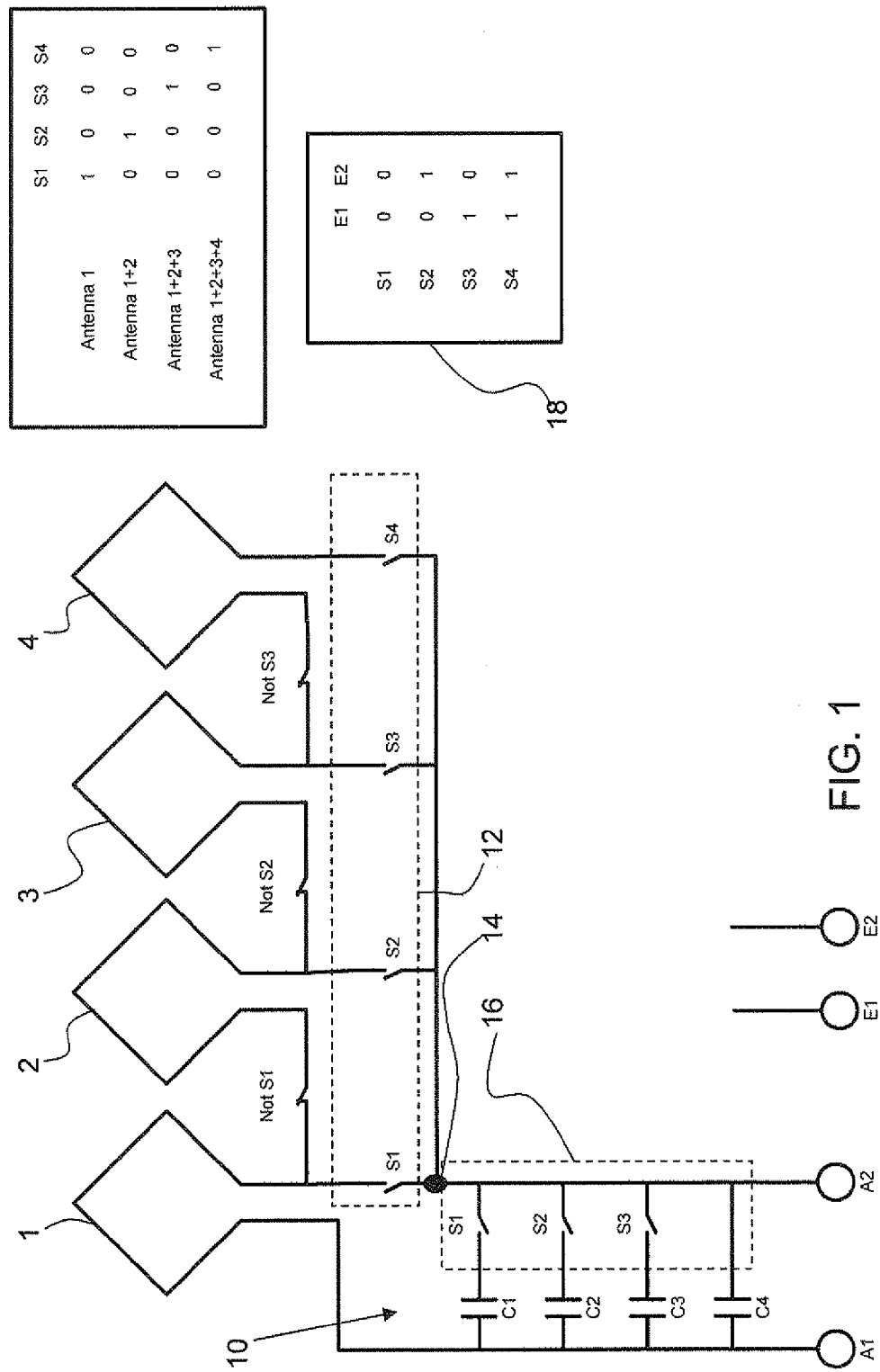
FIG. 1 shows an example of antenna of the invention.

FIG. 1 shows an example of an antenna of the invention in which the number of turns is adjustable by a selector.

The antenna is made up of four coils 1, 2, 3, 4 and a bank 10 of four parallel capacitors C1 to C4.

A switching arrangement is configurable to define at least two operating modes, in which a different combination of antenna coils and capacitors is connected into circuit, such as to define the same operating frequency but with a different number of antenna coils. In the example shown, there are four possible modes, with 1, 2, 3 and 4 of the coils connected in series. The switching arrangement is configurable to select one capacitor for each operating mode.

The switch arrangement comprises a respective switch S1 to S4 associated with each coil 1 to 4 within a first switch bank 12 between one terminal of each coil and the capacitor bank (node 14). When only one of the switches S1 to S4 is selected, it provides the return to the capacitor bank at node 14, so that it defines how many inductor coils are in series.

FIG. 1 also shows a respective switch between each adjacent pair of coils to define a series connection of all coils. These switches NotS1, NotS2 and NotS3 are not essential since the switches S1 to S4 provide the required isolation, but they can be used to fully disconnect both sides of the unwanted coils from the antenna circuit. In combination, the switches mean that a series connection is made of desired coils, and the other coils are isolated from both ends.

As shown in FIG. 1, each of the four modes is defined by having a selected one (only) of the switches S1 to S4 of closed. For example, for coils 1 and 2 in series, switch S2 is closed. NotS1 is closed and S1 is open so that the series connection is made. NotS2, S3 and S4 are open so that neither of the other coils is connected into circuit at all.

A further switch bank 16 is part of the capacitor bank 10. In the example shown, at least one capacitor is always connected (C4 in this example) and a selected one of the other capacitors is connected in parallel to define a capacitance which varies with the number of coils, to maintain a constant LC constant. Of course, a further switch S4 could be provided so that only one capacitor is connected into circuit.

The antenna has two supply pins A1, A2, and switch selection pins E1,E2 for enabling the mode to be selected. The truth table 18 shows one possible mapping between the values of E1 and E2 and the switch settings.

This antenna design enables a different number of coils to be switched into the antenna circuit, while maintaining the same operating frequency. Different numbers of antenna coils give rise to a different operating current and power consumption, and different magnetic field strength. Thus, the antenna configuration can be tailored to the particular communications being carried out.

The antenna can for example stay tuned to the signal carrier frequency of 13.56 MHz for NFC communications.

The configuration of the antenna can be selected by providing signals to the E1,E2 pins. There are various applications where it can be desirable to change the antenna setting.

For example, a NFC communication system can be part of a laptop computer. If the power adapter is connected, power consumption is not an issue, and a low number of coils with high current can be used, to generate a strong magnetic field. If the laptop is running on battery, the power consumption becomes more important and more coils can be used. Thus, the laptop can set the antenna setting based on how it is receiving power.

For a mobile phone application, the number of coils can be selected based on the remaining battery life, or simply based on a user command.

Different types of communication may also require different signal strength. For example, in payment applications with communication to cryptographic cards, a strong RF field can be required, so less coils and a higher current can be used.

In the example above, the system can be configured to have 1 to 4 coils. However, the range of selection may be different and not go down to 1 coil. For example, there may be 8 coils in total and controllability between 4 and 8 coils.

The user or the application running on the host device (e.g. laptop or mobile phone) controls the antenna setting according to the needs of the application.

The invention is of particular interest for NFC antennas, but it can be used in other wireless applications, such as BlueTooth and Wifi.

The switch configuration shown is only one possible example, and there are clearly other ways of arranging switches to enable a selected set of series inductors to be connected to the antenna terminals. The principle can thus be generalized to an antenna comprising n turns and using any suitable switching arrangement. The modes can include a number "a" of series coils ("a" from 1 to n−1) to a number n of series coils.

In the example above, the multiple antenna coils are connected in series. The different configurations may include parallel connections of antenna coils as well or instead. A parallel connection to a fixed voltage supply would give the same current per coil, and would therefore increase power consumption, but would give increased field strength or a field spread over a larger area.

The invention provides flexibility in that the number of turns can be adjusted as a function of the needs of the application. The transmission yield can be optimized.

Figure 2:
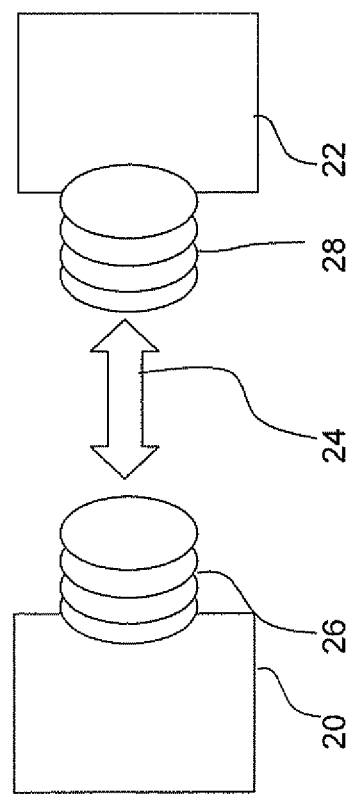
FIG. 2 shows the antenna used in a near field communication apparatus.

FIG. 2 shows in simplified form a system of the invention. The system has two NFC devices 20, 22 communicating over a magnetic induction link 24. Each device comprises communications circuitry linked to an antenna 26, 28 of the type described above. Of course, only one of the two devices may have the reconfigurable antenna, and this would be the initiator rather than the target.

The communications circuitry outputs the desired values for the control bits E1, E2 of the antenna.

Various other modifications will be apparent to those skilled in the art.

The invention claimed is:

1. An antenna comprising:
   a set of at least two antenna coils;
   a bank of at least two capacitors; and
   a switching arrangement,
   wherein the switching arrangement is selectably configurable to define at least two operating modes, in which different combinations of antenna coils and capacitors are selectably connected into circuit, wherein the different combinations of antenna coils and capacitors, define the same operating frequency in the two operating modes but with a different number of antenna coils for the respective operating modes, and wherein the operating modes comprise different power consumption modes of operation, corresponding to respective different amounts of power from the use of the set of antenna coils to generate a magnetic field, wherein in a first of the operating modes, a first current is provided to a first set of a first number of antenna coils for consumption by the first set, and wherein in a second of the operating modes, a second current, higher than the first current, is provided to a second set of a second number of antenna coils, wherein the second number of antenna coils is lower than the first number of antenna coils.

2. An antenna as claimed in claim 1, wherein at least two antenna coils are connected in series in one of the operating modes; and wherein the switching arrangement is configured to change the operating modes in response to a desired change in the signal strength for an RF field at the operating frequency.

3. An antenna as claimed in claim 1, further comprising a set of n antenna coils, where the switching arrangement is configurable to define a plurality of operating modes, each operating mode comprising a different number of the antenna coils in series and a different capacitance in parallel with the antenna coils, wherein an antenna LC value for the antenna is constant between the plurality of operating modes.

4. An antenna as claimed in claim 3, wherein the switching arrangement is configurable to define n operating modes.

5. An antenna as claimed in claim 3, wherein the capacitor bank comprises n capacitors in parallel, and the switching arrangement is configurable to select a different capacitor or parallel combination of capacitors for each operating mode.

6. An antenna as claimed in claim 1, wherein the switching arrangement comprises a respective switch between one terminal of each antenna coil and the capacitor bank.

7. An antenna as claimed in claim 6, wherein the switch arrangement comprises a respective switch between each adjacent pair of antenna coils to define a series connection of all antenna coils.

8. An antenna as claimed in claim 1, further comprising no more than four antenna coils in one of the sets.

9. An antenna as claimed in claim 8, further comprising a pair of control pins for setting four different switch settings for four modes.

10. A communications apparatus comprising:
   an antenna that includes:
      a set of at least two antenna coils;
      a bank of at least two capacitors; and
      a switching arrangement that is configurable to define at least two operating modes, in which different combinations of the antenna coils and the capacitors are connected in respective operating modes, wherein the different combinations of antenna coils and capacitors have the same operating frequency; and
   a controller circuit configured to:
      select between the at least two operating modes of the antenna,
      provide, in a first of the operating modes, a first current to a first number of antenna coils; and
      provide, in a second of the operating modes, a second current, higher than the first current, to a second number of antenna coils, lower than the first number of antenna coils.

11. A communications apparatus as claimed in claim 10, wherein the apparatus is configured to function as a near field communication apparatus.

12. A method of setting an operating mode of an antenna, which comprises a set of at least two antenna coils, a bank of at least two capacitors and a switching arrangement, the method comprising:
   configuring the switching arrangement to define a selected one of at least two selectably operating modes, in which different operating modes, a different combination of antenna coils and capacitors is connected into circuit, wherein the different combinations of antenna coils and capacitors define the same operating frequency in two operating modes but with a different number of antenna coils, and wherein the operating modes comprise different power consumption modes of operation, the power consumption modes each consuming a different amount of power from the use of the set of antenna coils to generate a magnetic field; and
   changing an amount of current through the antenna for a first one of the power consumption modes relative to an amount of current through the antenna for a second one of the power consumption modes, wherein fewer antenna coils are connected in the first one of the power consumption modes than in the second one of the power consumption modes.

13. The method of claim 12, further comprising selecting between the different operating modes based upon a relative amount of power consumed in the at least two operating modes, and in response to the step of selecting, using a different amount of current through the antenna for another of the sets of antenna coils.

14. The method of claim 12, wherein changing an amount of current includes increasing an amount of current through the antenna for a first one of the power consumption modes relative to an amount of current through the antenna for a second one of the power consumption modes.

15. The method of claim 12, wherein the increasing is in response to whether or not a device that includes the antenna is using battery power.

16. The method of claim 12, wherein the different number of antenna coils give rise to different operating current, different power consumption and different magnetic field strength.

17. The method of claim 12, wherein the different number of antenna coils give rise to different operating current, different power consumption and different magnetic field strength, and further comprising increasing an amount of current through the antenna for a first one of the power consumption modes relative to an amount of current through the antenna for second one of the power consumption modes.

* * * * *